US012782587B2

(12) United States Patent
Nohara

(10) Patent No.: US 12,782,587 B2
(45) Date of Patent: Nov. 3, 2026

(54) POSITION ESTIMATION DEVICE, CARGO MANAGEMENT DEVICE, AND CARGO MONITORING SYSTEM

(71) Applicant: PACIFIC INDUSTRIAL CO., LTD., Ogaki (JP)

(72) Inventor: Kazuki Nohara, Gifu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 296 days.

(21) Appl. No.: 18/689,156

(22) PCT Filed: Oct. 31, 2022

(86) PCT No.: PCT/JP2022/040628
§ 371 (c)(1),
(2) Date: Mar. 5, 2024

(87) PCT Pub. No.: WO2023/105989
PCT Pub. Date: Jun. 15, 2023

(65) Prior Publication Data
US 2024/0427029 A1 Dec. 26, 2024

(30) Foreign Application Priority Data
Dec. 10, 2021 (JP) ................................ 2021-201149

(51) Int. Cl.
*G01S 19/45* (2010.01)
*G01S 19/14* (2010.01)
*G01S 19/34* (2010.01)

(52) U.S. Cl.
CPC .............. *G01S 19/45* (2013.01); *G01S 19/14* (2013.01); *G01S 19/34* (2013.01)

(58) Field of Classification Search
CPC .......... G01S 19/45; G01S 19/13; H04W 4/02; H04W 4/029
See application file for complete search history.

(56) References Cited

U.S. PATENT DOCUMENTS 5,491,486 A * 2/1996 Welles, II ............ G01S 5/0009 701/490
6,975,941 B1 * 12/2005 Lau .................... G01C 21/3415 340/988
11,140,519 B1 10/2021 Lin et al.
2006/0227047 A1 10/2006 Rosenberg
2021/0383462 A1 12/2021 Nagasawa

FOREIGN PATENT DOCUMENTS

CN 102346040 A 2/2012
EP 0 528 530 A1 2/1993
(Continued)

OTHER PUBLICATIONS

Dec. 6, 2022 International Search Report issued in International Patent Application No. PCT/JP2022/040628.
(Continued)

*Primary Examiner* — Cassi J Galt
(74) *Attorney, Agent, or Firm* — Oliff PLC

(57) ABSTRACT

A position estimation device configured to update and output current position data using GPS position data sequentially input from a GPS module includes: a first data update unit configured to compare the current position data with the GPS position data newly acquired, to determine whether there is a change therebetween beyond a variation range of the GPS position data, and to update the current position data with that GPS position data upon determining that there is a change beyond predetermined variation range; and a second data update unit configured to acquire a detection result from a movement detection sensor configured to detect presence or absence of a movement including vibration of the position estimation device, to determine whether a movement of the position estimation device has been detected, and to update the current position data with the GPS position data newly acquired upon determining that the movement has been detected.

12 Claims, 8 Drawing Sheets

(56) References Cited

FOREIGN PATENT DOCUMENTS

| | | | |
|---|---|---|---|
| EP | 1 236 289 | B1 | 3/2013 |
| JP | H07-55486 | A | 3/1995 |
| JP | 2002-150489 | A | 5/2002 |
| JP | 2007-024700 | A | 2/2007 |
| JP | 2011-117943 | A | 6/2011 |
| JP | 2012-185154 | A | 9/2012 |
| JP | 2013-015503 | A | 1/2013 |
| JP | 2020-161906 | A | 10/2020 |
| WO | 2018/158864 | A1 | 9/2018 |
| WO | 2020/065751 | A1 | 4/2020 |

OTHER PUBLICATIONS

Dec. 6, 2022 Written Opinion issued in International Patent Application No. PCT/JP2022/040628.
Jan. 19, 2022 Office Action issued in Japanese Patent Application No. 2021-201149.
May 13, 2022 Office Action issued in Japanese Patent Application No. 2021-201149.
Jul. 21, 2023 Office Action issued in Japanese Patent Application No. 2021-201149.
Nov. 29, 2024 Search Report issued in European Patent Application No. 22903921.9.
Dec. 11, 2024 Office Action issued in European Patent Application No. 22 903 921.9.

* cited by examiner

POSITION ESTIMATION DEVICE, CARGO MANAGEMENT DEVICE, AND CARGO MONITORING SYSTEM

TECHNICAL FIELD

The present disclosure relates to a position estimation device, a cargo management device, and a cargo monitoring system.

BACKGROUND ART

In recent years, GPS modules have been mounted on various devices such as smart phones and position tracking terminals for children and baggage (see, for example, Patent Document 1).

RELATED ART DOCUMENTS

Patent Documents

Patent Document 1: JP 2020-161906 A (paragraph [0006])

SUMMARY OF THE INVENTION

Problems to be Solved by the Invention

However, since GPS position data output from the GPS module varies, there is a demand for development of a technique for updating current position data while suppressing an influence of the variation.

Means of Solving the Problems

A position estimation device according to a first aspect of the present disclosure made to solve the above problem is a position estimation device configured to update and output current position data by using part of a plurality of pieces of GPS position data sequentially input from a GPS module, and includes a first data update unit configured to compare the current position data with GPS position data newly acquired, to determine whether or not there is a change therebetween beyond a variation range of the GPS position data, and to update the current position data with that GPS position data upon determining that there is a change beyond a fixed range predetermined as the variation range, and a second data update unit configured to acquire a detection result from a movement detection sensor configured to detect presence or absence of a movement including vibration of the position estimation device, to determine whether a movement of the position estimation device has been detected, and to update the current position data with the GPS position data newly acquired upon determining that the movement has been detected.

MODE FOR CARRYING OUT THE INVENTION

First Embodiment

Figure 1:
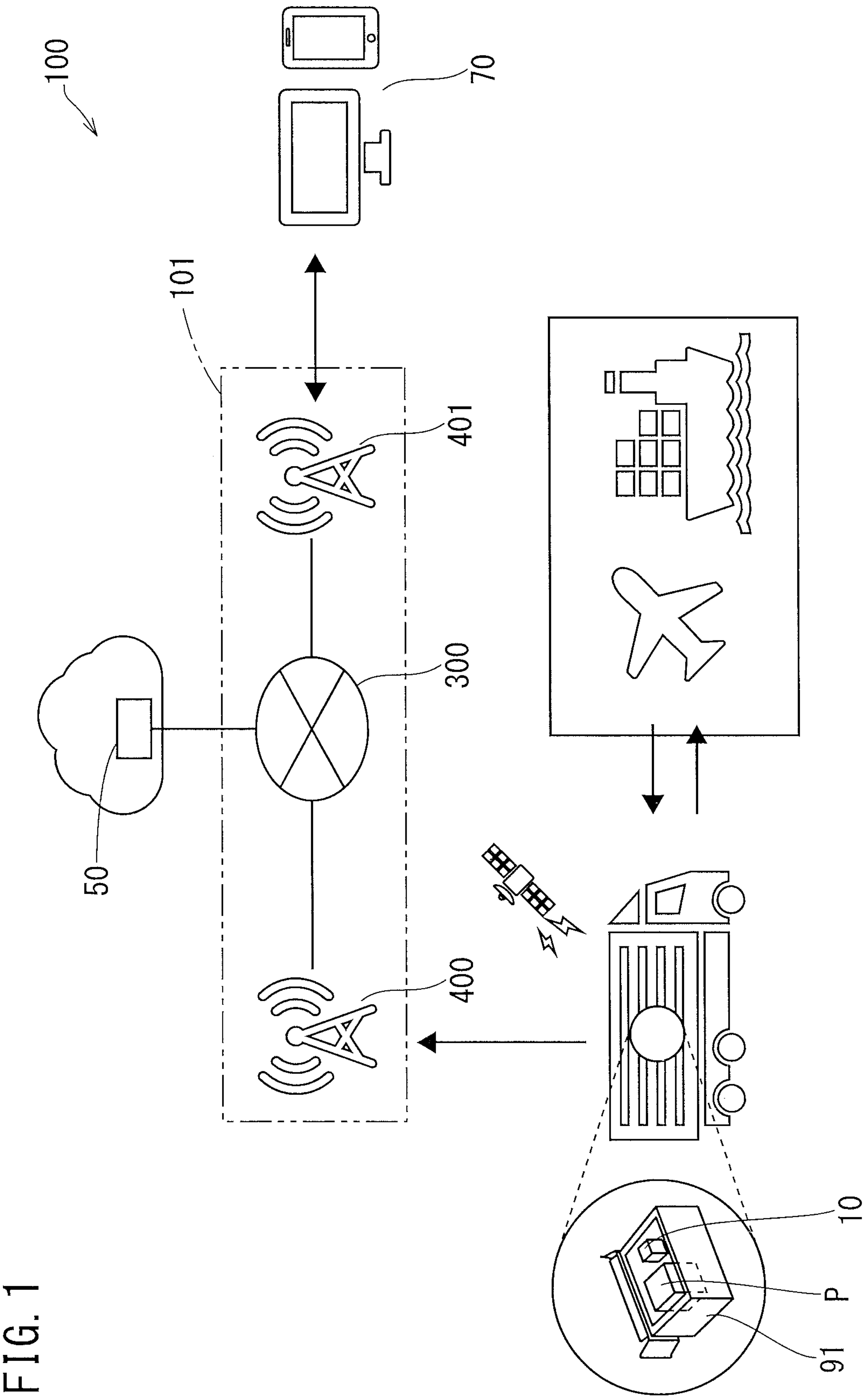
FIG. 1 is a schematic diagram illustrating an overall configuration of a cargo monitoring system according to a first embodiment.

A cargo monitoring system 100 according to a first embodiment of the present disclosure will be described with reference to FIGS. 1 to 5. The cargo monitoring system 100 according to the present embodiment is a system that grasps a transport status of a cargo P that is a target to be managed, and includes, as illustrated in FIG. 1, a cargo management device 10 that moves with the cargo P and acquires information regarding the transport status, a cloud server 50 that manages the information regarding the transport status acquired by the cargo management device 10, and an external terminal 70 that receives provision of the information acquired by the cargo management device 10 via the cloud server 50. The cargo management device 10, the cloud server 50, and the external terminal 70 are connected via a communication network 101 including wireless base stations 400, 401.

Here, the transport of the cargo P includes movement of the cargo P by a vehicle, an aircraft, a ship, a train, a person, and the like, and temporary storage in a warehouse, a container, and the like in a process from shipment to receipt of the cargo P. Note that, for example, the cargo management device 10 is attached to the inside of a storage container 91 that can store the cargo P and can be carried together with the cargo P. The storage container 91 is, for example, a heat insulating container, a cooler box, a refrigerator, a freezer, a dry container, or the like. The cargo P is, for example, a food item, a medicine, a specimen, an art, or the like. Further, in the cargo monitoring system 100, the number of cargo management devices 10 may be plural or one.

Figure 2:
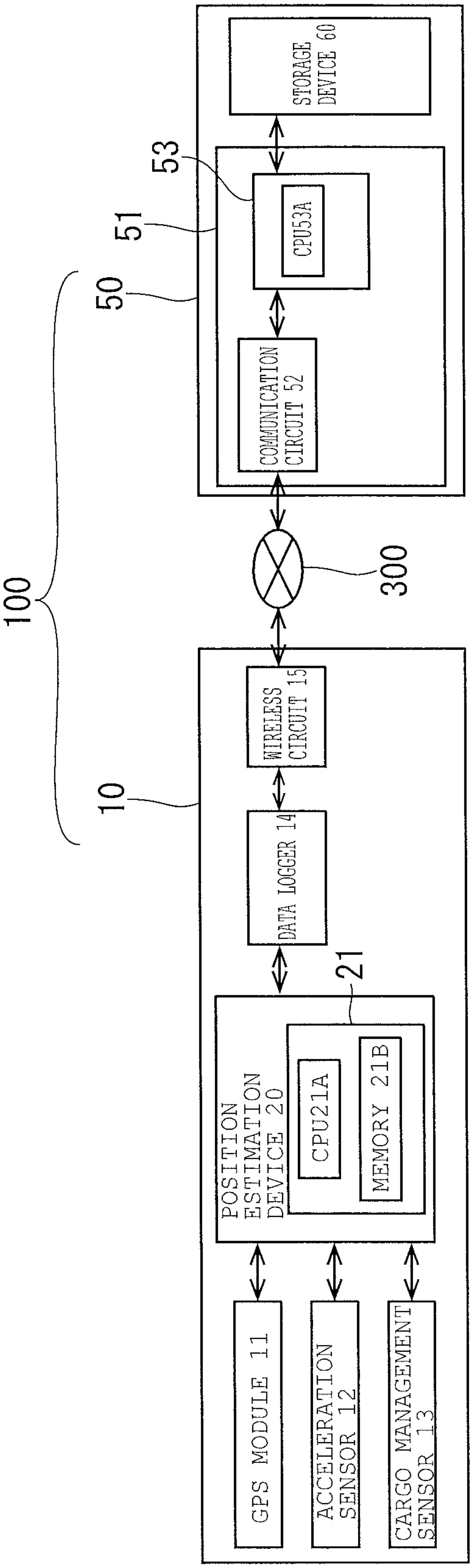
FIG. 2 is a block diagram illustrating an electrical configuration of a position estimation device and a cloud server.

As illustrated in FIG. 2, the cargo management device 10 includes a GPS module 11, an acceleration sensor 12, a cargo management sensor 13, a position estimation device 20, a data logger 14, and a wireless circuit 15. Note that the cargo management device 10 includes a power supply (not illustrated) that supplies power to the GPS module 11, the acceleration sensor 12, the cargo management sensor 13, the position estimation device 20, the data logger 14, the wireless circuit 15, and the like. The power supply is, for example, a primary battery, a secondary battery, or the like.

The GPS module 11 receives GPS satellite signals and calculates GPS position data of the cargo management device 10 (cargo P). The GPS position data is used to specify the current position data indicating the current position of the cargo management device 10 as the information regarding the transport status of the cargo P. The GPS position data has an error of, for example, 10 [m], and a position specified by the GPS position data varies in a range of, for example, a radius of 10 [m].

The acceleration sensor 12 is used to detect a movement of the cargo management device 10. For example, a time of acceleration, a time of deceleration, or a period from acceleration to deceleration may be determined as in a process of movement, and other periods may be determined as a stationary state by using the speed change data as the acceleration data detected by the acceleration sensor 12. In addition, since the movement is accompanied by vibration, the movement may be detected by the presence or absence of vibration using the vibration data as the acceleration data. Note that the acceleration sensor 12 corresponds to a "movement detection sensor" in the claims.

In the present embodiment, a temperature sensor, a humidity sensor, a pressure sensor, and an illuminance sensor are provided as the cargo management sensor 13, and measurement values such as temperature, humidity, atmospheric pressure, and illuminance in the storage container 91 are acquired as information regarding the transport status of the cargo P. Further, in the present embodiment, the acceleration sensor 12 is also used as the cargo management sensor 13 to acquire measurement values related to impact and vibration. The cargo management sensor 13 may include some of a temperature sensor, a humidity sensor, a pressure sensor, and an illuminance sensor, or may include a sensor that measures another measurement value in addition to the above sensors.

The position estimation device 20 includes, as a main part, a microcomputer 21 including a CPU 21A and a memory 21B such as a RAM, a ROM, and a flash memory. The CPU 21A is connected to devices such as the GPS module 11, the acceleration sensor 12, the cargo management sensor 13, and the data logger 14, and controls these devices to execute a position estimation program PG1 that will be described later. The memory 21B includes a specific data storage unit 22, an identification number storage unit 23, a program storage unit 24, and the like (see FIG. 3).

When the current position data is updated, the specific data storage unit 22 temporarily stores the current position data. The identification number storage unit 23 stores an identification number of the cargo management device 10. The program storage unit 24 stores the position estimation program PG1 and the like, and the CPU 21A executes the position estimation program PG1 every time measurement is performed by the GPS module 11C and the like.

Figure 3:
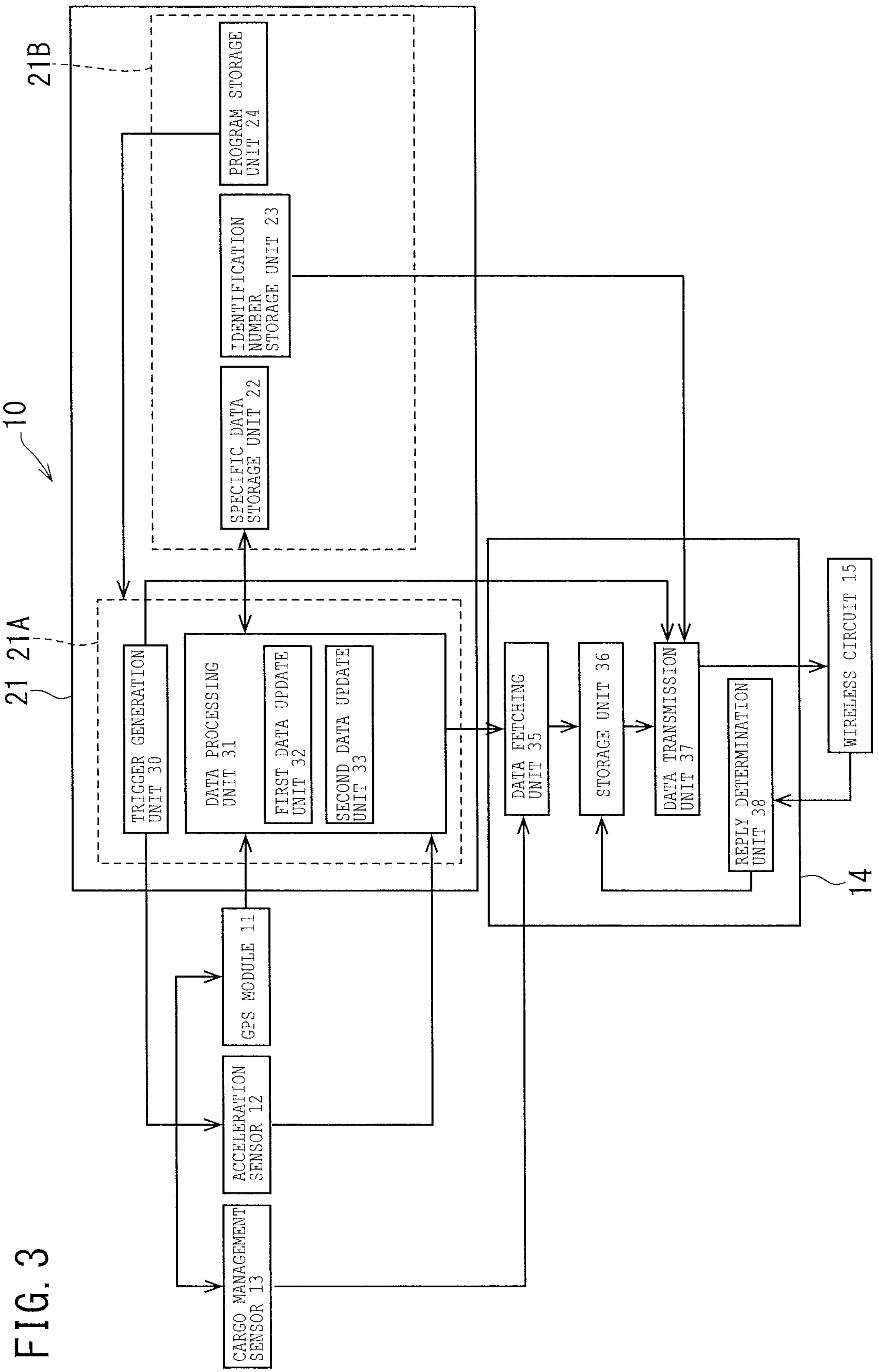
FIG. 3 is a block diagram illustrating a control configuration of the position estimation device.

The position estimation device 20 includes a control block illustrated in FIG. 3. Specifically, the CPU 21A functions as a trigger generation unit 30, a data processing unit 31, and the like by executing a plurality of predetermined programs including the above-described position estimation program PG1.

In the trigger generation unit 30, a measurement trigger is generated every certain period (for example, 1 minute), and the GPS module 11, the acceleration sensor 12, and the cargo management sensor 13 perform measurement every time the measurement trigger is generated. Then, the GPS position data calculated by the GPS module 11 and the acceleration data measured by the acceleration sensor 12 are provided to the data processing unit 31 in association with the measurement time, and the measurement value detected by the cargo management sensor 13 is provided to the data logger 14 in association with the measurement time.

The data processing unit 31 executes the position estimation program PG1 every time measurement is performed by the GPS module 11 and the acceleration sensor 12. The data processing unit 31 includes a first data update unit 32 and a second data update unit 33, and updates the current position data on the basis of the GPS position data and the acceleration data.

The first data update unit 32 determines whether or not there is a change beyond a variation range between GPS position data newly acquired and the current position data updated last time. As described above, the position specified by the GPS position data varies in a certain range even when the cargo management device 10 is actually in a stationary state. When the GPS position data newly acquired has changed beyond the variation range, relative to the current position data updated last time, the first data update unit 32 determines that the change is due to the movement of the cargo management device 10. The first data update unit 32 reads the current position data updated last time from the specific data storage unit 22, determines whether or not there is a change beyond the variation range between the current position data updated last time and the GPS position data newly acquired, and updates the current position data with that GPS position data when determining that there is a change beyond the variation range.

The second data update unit 33 determines whether or not a movement of the cargo management device 10 has been detected using the acceleration data, and updates the current position data with the GPS position data newly acquired, when determining that the movement has been detected.

In the present embodiment, the determination by the first data update unit 32 is performed before the determination by the second data update unit 33, and the determination by the second data update unit 33 is performed only when the first data update unit 32 determines that there is no change beyond the variation range between the GPS position data newly acquired and the current position data updated last time. That is, when the first data update unit 32 determines that there is a change beyond the variation range in the GPS position data newly acquired, relative to the current position data updated last time, the current position data is updated without performing the determination by the second data update unit 33. When the first data update unit 32 determines that there is no change beyond the variation range in the GPS position data newly acquired, relative to the current position data updated last time, the second data update unit 33 performs determination. The current position data is updated when it is determined that a movement of the cargo management device 10 has been detected. That is, even in a case where the first data update unit 32 determines that a change in GPS position data newly acquired, relative to the current position data updated last time, is a variation, the change is determined to be due to a movement of the cargo management device 10 when the second data update unit 33 determines that the movement has been detected.

In a case where the first data update unit 32 determines that there is no change beyond the variation range and the second data update unit 33 determines that a movement of the cargo management device 10 has not been detected, it is determined that the change of the GPS position data newly acquired, relative to the current position data updated last time, is not due to the movement. The current position data is not updated and the current position data updated last time is taken over as it is. In this way, the specified current position data is stored in the specified data storage unit 22, and is provided to the data logger 14 in association with the measurement time.

The data logger 14 collects the current position data specified by the data processing unit 31 and the measurement value detected by the cargo management sensor 13, and collectively stores them in chronological order. The data logger 14 includes a data fetching unit 35, a storage unit 36, a data transmission unit 37, and a reply determination unit 38.

The data fetching unit 35 fetches the current position data specified by the data processing unit 31 and the measurement value detected by the cargo management sensor 13, generates transport status data D1 collected for each measurement time, and stores it in the storage unit 36.

The data transmission unit 37 generates, in a data frame having a predetermined data length, transmission data D2 in which a plurality of pieces of the transport status data D1 accumulated in the storage unit 36 and the identification number of the cargo management device 10 read from the identification number storage unit 23 are stored. Then, every time the trigger generation unit 30 generates a transmission trigger at a predetermined cycle (for example, 10 [min]), the data transmission unit 37 wirelessly transmits the generated transmission data D2 using the wireless circuit 15.

The transmission data D2 transmitted by the data transmission unit 37 is received by the cloud server 50 via a general-purpose communication line 300. As illustrated in FIG. 2, the cloud server 50 includes at least one or more personal computers including a monitoring terminal 51, and a storage device 60. Note that the cloud server 50 corresponds to a "cargo monitoring device" in the claims.

Figure 4:
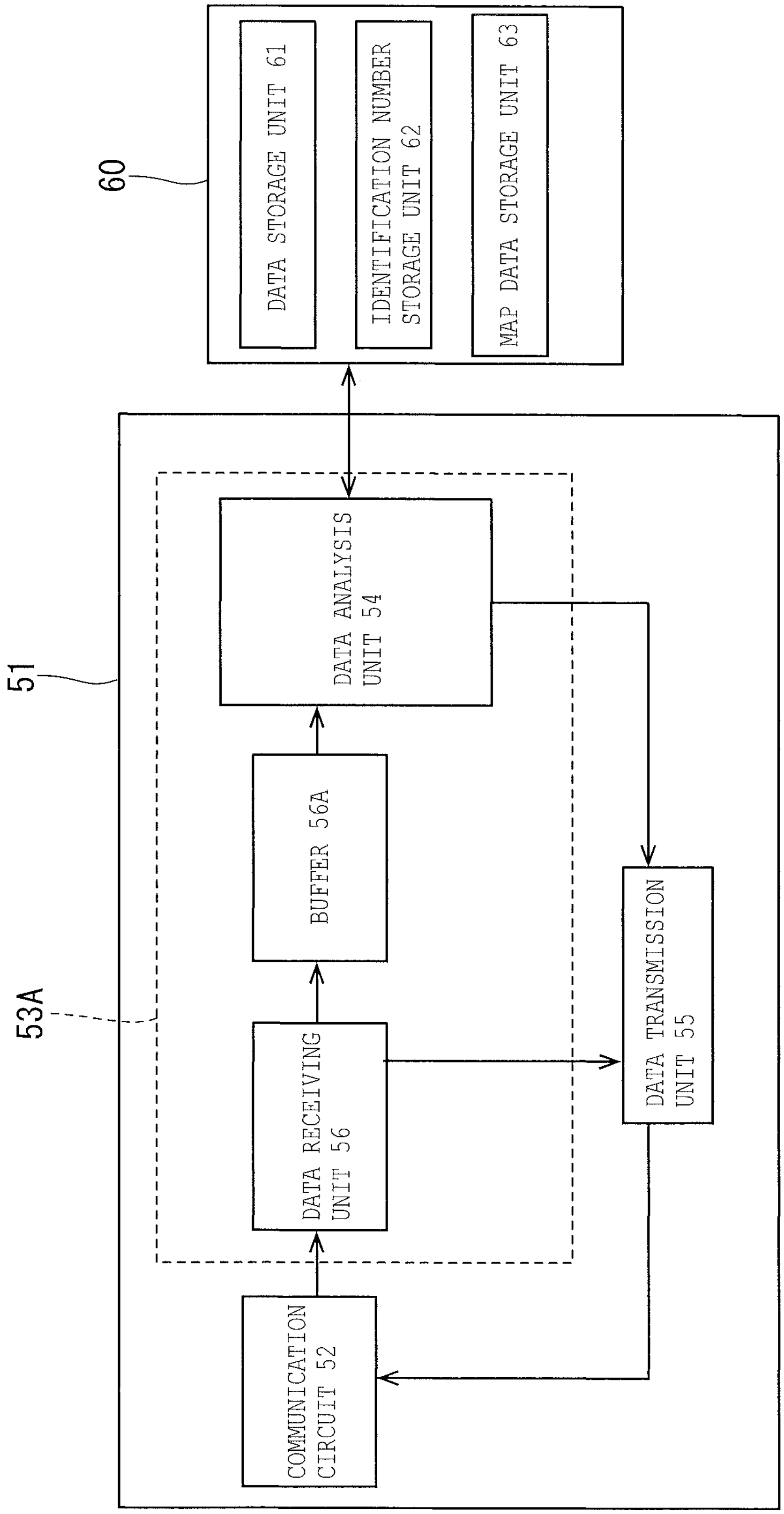
FIG. 4 is a block diagram illustrating a control configuration of a cloud server.

The storage device 60 includes a data storage unit 61, an identification number storage unit 62, a map data storage unit 63, and the like (see FIG. 4). The data storage unit 61 stores movement trajectory data and the like, which will be described later, generated from the received transmission data D2. An identification number of the cargo management device 10 is stored in the identification number storage unit 62, and the cargo management device 10 can be specified from the identification number. The map data storage unit 63 stores map data.

As illustrated in FIG. 2, the monitoring terminal 51 includes, as main parts, at least a communication circuit 52 and a control unit 53 including a CPU 53A. The communication circuit 52 receives the transmission data D2 from the cargo management device 10 via the general-purpose communication line 300, and transmits and receives data to and from the external terminal 70. Every time the communication circuit 52 receives the transmission data D2 from the cargo management device 10, the CPU 53A executes a predetermined program (not illustrated) and functions as a control block of a data analysis unit 54 and the like (see FIG. 4).

The monitoring terminal 51 includes a control block illustrated in FIG. 4. Specifically, the CPU 53A functions as a data receiving unit 56, the data analysis unit 54, and the like by executing the above-described program.

The data receiving unit 56 fetches the transmission data D2 transmitted from the cargo management device 10 through the communication circuit 52.

Here, when the data receiving unit 56 receives the transmission data D2, a data transmission unit 55 returns an ACK signal indicating the reception. Specifically, the data transmission unit 55 extracts the identification number of the cargo management device 10 included in the transmission data D2, stores the identification number and the reception time in a preset data frame to generate an ACK signal, and wirelessly transmits the ACK signal by the communication circuit 52. In response thereto, the reply determination unit 38 (see FIG. 3) of the cargo management device 10 determines whether or not the transmission data D2 has been received by the cloud server 50 on the basis of whether or not the ACK signal including its own identification number has been received.

When the reply determination unit 38 receives the ACK signal, it is determined that the transmission data D2 has been received by the cloud server 50, and the transport status data D1 included in that transmission data D2 is deleted from the storage unit 36 of the data logger 14. Here, there is a case where the wireless communication with the wireless base stations 400, 401 cannot be performed when the cargo P is loaded on an aircraft or a ship. In such a case, the transmission data D2 transmitted by the cargo management device 10 is not received by the monitoring terminal 51. Then, since the data transmission unit 55 of the monitoring terminal 51 does not return the ACK signal, the reply determination unit 38 of the cargo management device 10 determines that the transmission data D2 has not been received by the cloud server 50, keeps storing in the storage unit 36 the transport status data D1 included in the transmission data D2 that has not been received. The transmission data D2 including those transport status data D1 is generated and transmitted at the timing of transmitting the next transmission data D2.

When the data receiving unit 56 receives the transmission data D2, the monitoring terminal 51 adds, for example, a reception time to the transmission data D2 and stores the transmission data D2 in a buffer 56A. Then, the data analysis unit 54 analyzes the current position data and the measurement values included in the transmission data D2 stored in the buffer 56A. Specifically, the map data is acquired from the map data storage unit 63, a position specified by the current position data is plotted on the map data, and movement trajectory data indicating a movement trajectory of the cargo management device 10 in chronological order is generated. In addition, a measurement value table in which measurement values are organized in chronological order is generated. They are stored in the data storage unit 61. Then, when the next transmission data D2 is transmitted from the cargo management device 10, the next transmission data D2 is added to the movement trajectory data and the measurement value table as needed. Then, when there is a request from the external terminal 70, the data transmission unit 55 specifies, from the identification number storage unit 62, the cargo management device 10 corresponding to the identification number, and transmits the movement trajectory data and the measurement value table to the external terminal 70. In addition, even if there is no request from the external terminal 70, transmission to the external terminal 70 may be periodically performed. In addition, whether or not there is an abnormal change may be determined for each measurement value, and abnormality determination data may be generated and transmitted to the external terminal 70 when there is an abnormality.

The external terminal 70 is a terminal owned by a shipper or a receiver of the cargo P or a driver during transport, and may be, for example, a personal computer, a tablet, a smartphone, or the like, and may be any general communication means capable of communicating with the cloud server 50. As described above, the external terminal 70 receives, from the cloud server 50, the notification of the movement trajectory data, the measurement value table, the abnormality determination data, and the like. In addition, it may be configured that the external terminal 70 accesses the cloud server 50 so that the movement trajectory data, the measurement value table, the abnormality determination data, and the like can be freely browsed on the cloud server 50.

Figure 5:
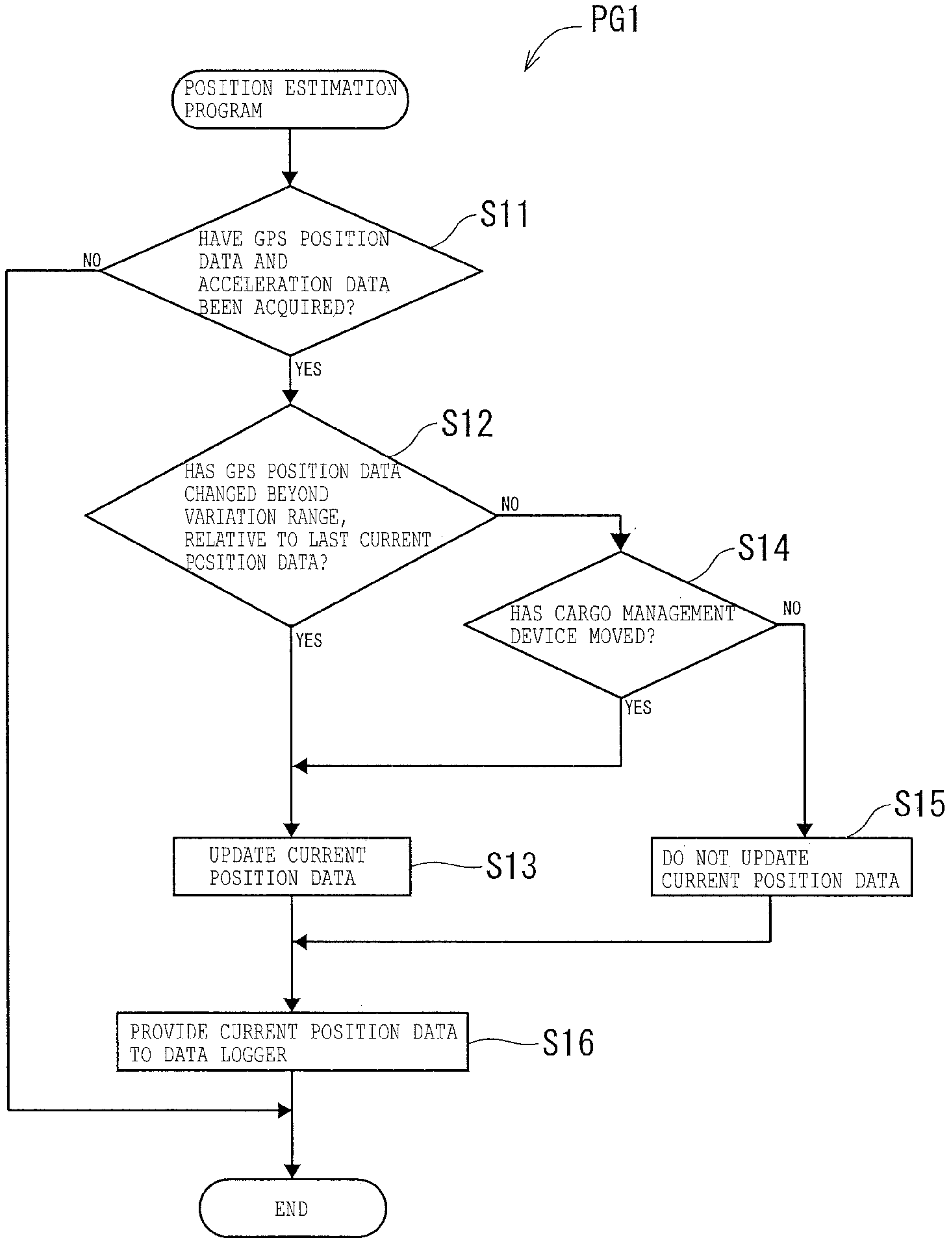
FIG. 5 is a flowchart of a position specifying program.

Hereinafter, an example of the position estimation program PG1 executed by the CPU 21A of the position estimation device 20 is illustrated in FIG. 5. As described above, the position estimation program PG1 is executed every time the GPS position data and the acceleration data are acquired from the GPS module 11 and the acceleration sensor 12 (YES in S11). Then, in step S12, it is determined whether or not the GPS position data newly acquired by the GPS module 11 has changed beyond the variation range, relative to the current position data updated last time. When it is determined that the GPS position data newly acquired has changed beyond the variation range (YES in S12), it is determined that the change is due to a movement of the cargo management device 10, and the current position data is updated with that GPS position data (S13). Here, the CPU 21A executing steps S12 and S13 corresponds to the first data update unit 32 described above.

When the GPS position data newly acquired has not changed beyond the variation range (NO in S12), it is determined in step S14 whether or not a movement of the cargo management device 10 has been detected from the newly acquired acceleration data. When it is determined that a movement has been detected (YES in S14), it is determined that the change in the GPS position data is not due to the variation but due to the movement of the cargo management device 10, and the current position data is updated with that GPS position data (S13).

On the other hand, when it is determined that the change in the GPS position data is within the variation range and it is determined that a movement of the cargo management device 10 has not been detected (NO in S12, NO in S14), it is determined that the change in the GPS position data is not due to the movement, and that GPS position data is not updated as the current position data, and the current position of the cargo management device 10 takes over the current position data updated last time as it is (S15). The current position data specified in this manner is provided to the data logger 14 (S16). Here, the CPU 21A executing steps S13 to S15 corresponds to the second data update unit 33 described above.

The configuration of the cargo monitoring system 100 of the present embodiment has been described above. In the cargo monitoring system 100 of the present embodiment, the GPS module 11 and the acceleration sensor 12 are provided in the cargo management device 10 transported together with the cargo P which being a target to be managed. The position estimation device 20 provided in the cargo management device 10 updates the current position data on the basis of the detection results as the cargo P moves. The position estimation device 20 includes: the first data update unit 32 that determines whether or not there is a change beyond a variation range between the GPS position data newly acquired from the GPS module 11 and the current position data updated last time, and updates the current position data with that GPS position data when determining that there is the change; and the second data update unit 33 that determines whether or not a movement of the cargo management device 10 has been detected from the acceleration data acquired from the acceleration sensor 12, and updates the current position data with the GPS position data newly acquired, when determining that the movement has been detected. When the GPS position data newly acquired has changed beyond the variation range, relative to the current position data updated last time, the first data update unit 32 determines that the change is due to the movement of the cargo management device 10, and updates the current position data with that GPS position data. With this configuration, since the current position data is updated when the change in the GPS position data exceeds the variation range, it is possible to update the current position data while suppressing an influence of the variation in the GPS position data.

Furthermore, in the present embodiment, when the first data update unit 32 determines that there is no change beyond the variation range, in the GPS position data newly acquired, relative to the current position data updated last time, the second data update unit 33 additionally performs determination, and the current position data is updated when it is determined that a movement of the cargo management device 10 has been detected. In the determination by the first data update unit 32, when the GPS position data newly acquired has not change beyond the variation range, relative to the current position data updated last time, the change is determined to be due to the variation even if the change is actually due to a movement of the cargo management device 10. However with this configuration, it is possible to update the current position data by detecting the movement of the cargo management device 10 within the variation range by the determination by the second data update unit 33 without overlooking the movement.

In addition, since the cargo management device 10 includes the cargo management sensor 13 and measures the measurement value related to the transport status of the cargo P, it is also possible to recognize the transport status of the cargo P. In the present embodiment, since the temperature sensor, the humidity sensor, the pressure sensor, the illuminance sensor, and the acceleration sensor are provided as the cargo management sensor 13, it is possible to recognize, as a transport status of the cargo P, temperature and humidity by the temperature sensor and the humidity sensor, impact and vibration by the pressure sensor and the acceleration sensor, opening and closing of a cargo bed by the illuminance sensor, and the like.

In addition, since the cargo management device 10 includes the wireless circuit 15 and wirelessly transmits the current position data and the measurement values to the cloud server 50, the transport status of the cargo P can be monitored in real time on the cloud server 50.

Furthermore, since the data logger 14 is provided in the cargo management device 10, even in a situation where, for example, the cargo P is loaded on an aircraft or a ship and wireless communication cannot be performed, data during that time can be accumulated in the data logger 14 and collectively transmitted when wireless communication becomes possible. In addition, since the current position data and the measurement values are accumulated in the data logger 14 in chronological order, it is possible, for example, to verify the movement trajectory and the transport conditions of the cargo P after the end of transport.

Moreover, since the cloud server 50 includes the data transmission unit 55 and is configured to be able to perform transmission to and reception from the external terminal 70, it is possible, for example, to appropriately notify the shipper or the receiver of the cargo P or the driver during the transport, of the movement trajectory, abnormality, or the like during the transport of the cargo P.

Second Embodiment

Next, the position estimation device 20 according to a second embodiment to which the present disclosure is applied will be described. In the following description, only differences from the first embodiment will be described, and redundant description of common configurations will be omitted.

In the position estimation device 20 of the first embodiment described above, it is configured that, when the data processing unit 31 updates the current position data on the basis of the GPS position data and the acceleration data, the determination by the first data update unit 32 is performed before the determination by the second data update unit 33, and the second data update unit 33 performs the determination when the first data update unit 32 determines that the GPS position data newly acquired has not changed beyond the variation range, relative to the current position data updated last time. In contrast, in the present embodiment, it is configured that the determination by the second data update unit 33 is performed before the determination by the first data update unit 32, and the determination by the first data update unit 32 is performed when determining that a movement of the cargo management device 10 has not been detected by the second data update unit 33.

Figure 6:
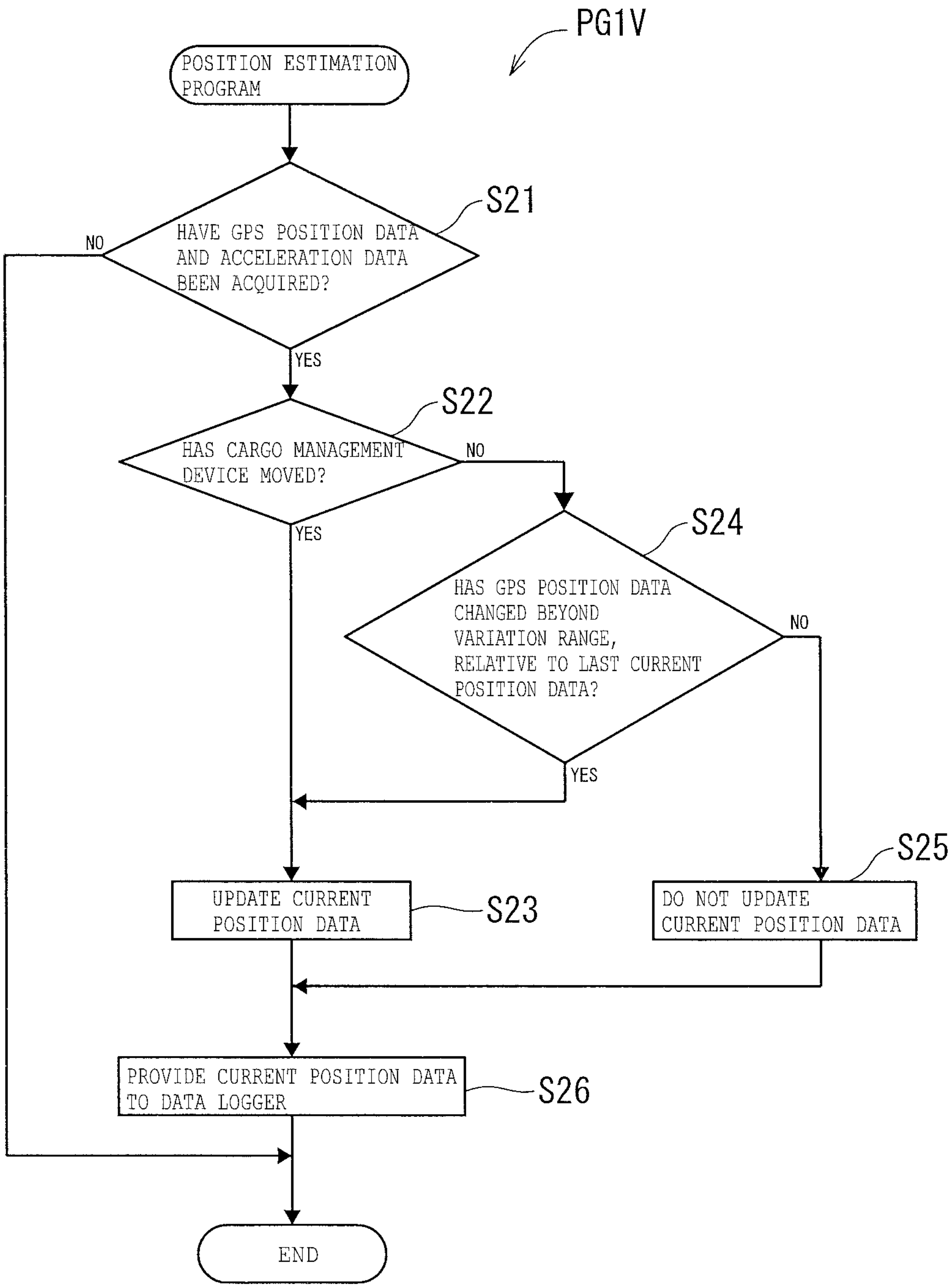
FIG. 6 is a flowchart of a position specifying program according to a second embodiment.

Specifically, in the present embodiment, the CPU 21A of the position estimation device 20 executes a position estimation program PG1V illustrated in FIG. 6. The position estimation program PG1V is executed every time the GPS position data and the acceleration data are acquired from the GPS module 11 and the acceleration sensor 12 (YES in S21), and determines whether or not a movement of the cargo management device 10 has been detected on the basis of the newly acquired acceleration data in step S22. When it is determined that a movement has been detected (YES in S22), the current position data is updated with the GPS position data newly acquired (S23). Here, the CPU 21A executing steps S22 and S23 corresponds to the second data update unit 33.

When it is determined in step S22 that the movement of the cargo management device 10 has not been detected (NO in S22), it is determined whether or not there is a change beyond the variation range between the GPS position data newly acquired and the current position data updated last time. When it is determined that the GPS position data newly acquired has changed beyond the variation range (YES in S24), it is determined that the change in the GPS position data is not due to the variation but due to a movement of the cargo management device 10, and the current position data is updated with that GPS position data (S23).

On the other hand, when it is determined that a movement of the cargo management device 10 has not been detected and it is determined that the change in the GPS position data is within the variation range (NO in S22, NO in S24), it is determined that the change in the GPS position data is not due to the movement, this GPS position data is not updated as the current position data, and the current position of the cargo management device 10 takes over the current position data updated last time as it is (S25). Here, the CPU 21A executing steps S23 to S25 corresponds to the first data update unit 32.

In the present embodiment, the GPS position data and the acceleration data are acquired before the second data update unit 33 performs the determination (S21). However, only the acceleration data may be acquired in step S21, and the GPS position data may be acquired after the second data update unit 33 performs the determination in step S22.

According to the present embodiment, the determination by the second data update unit 33 only may cause a situation in which a movement of the cargo management device 10 is not detected and the current position data is not updated in case of movement of the cargo management device 10 mounted on a low-vibration moving body such as a bullet train, for example. However, by performing the determination by the first data update unit 32, it is possible to update the current position data while suppressing the occurrence of such a situation.

Third Embodiment

In the position estimation device 20 of the above first embodiment and the above second embodiment, it is configured that, when the data processing unit 31 updates the current position data on the basis of the GPS position data and the acceleration data, either the determination by the first data update unit 32 or the determination by the second data update unit 33 is performed first. In contrast, in the present embodiment, it is configured that both determinations are performed in parallel, and when at least one of the determination that the GPS position data newly acquired by the first data update unit 32 has changed beyond the variation range and the determination that a movement of the cargo management device 10 has been detected by the second data update unit 33 is made, the current position data is updated with the GPS position data newly acquired.

Figure 7:
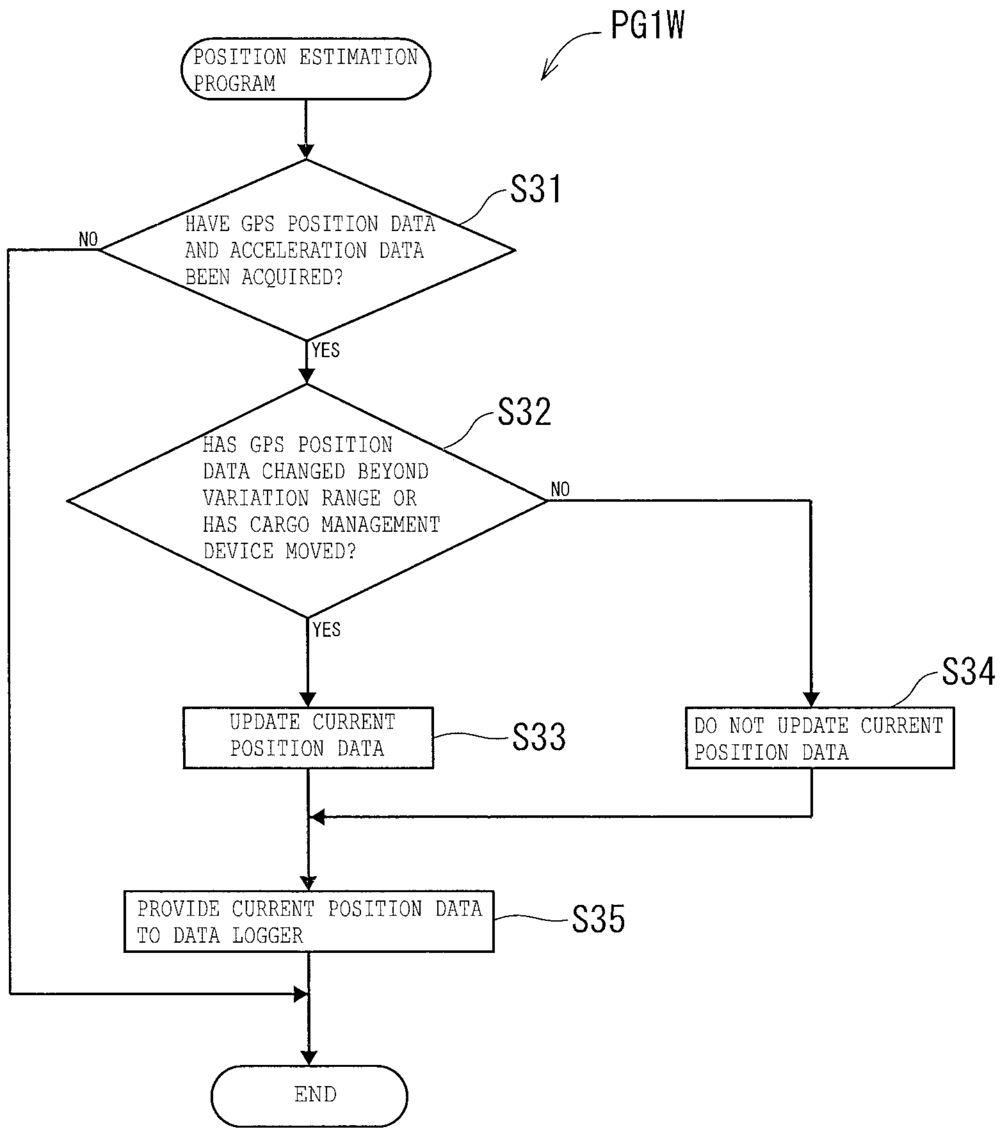
FIG. 7 is a flowchart of a position specifying program according to a third embodiment.

Specifically, in the present embodiment, the CPU 21A of the position estimation device 20 executes a position estimation program PG1W illustrated in FIG. 7. The position estimation program PG1W is executed every time the GPS position data and the acceleration data are acquired from the GPS module 11 and the acceleration sensor 12 (YES in S31), and determines whether or not the GPS position data newly acquired has changed beyond the variation range and determines whether or not a movement of the cargo management device 10 has been detected on the basis of the newly acquired acceleration data in step S32. Then, when it is determined that there is a change beyond the variation range in the GPS position data newly acquired or it is determined that a movement of the cargo management device 10 has been detected (YES in S32), the current position data is updated with the GPS position data newly acquired (S33).

When both of the determination that the GPS position data newly acquired has not changed beyond the variation range and the determination that a movement of the cargo management device 10 has not been detected are made in step S32 (NO in S32), it is determined that the change in the GPS position data is not due to the movement, and the GPS position data is not updated as the current position data, and the current position of the cargo management device 10 takes over the current position data updated last time as it is (S34). Here, the CPU 21A executing steps S32 to S34 corresponds to the first data update unit 32 and the second update unit 33.

Other Embodiments (1) In the above embodiments, the second data update unit 33 is configured to determine whether or not the cargo management device 10 is moving when the GPS position data is acquired, but may be configured to determine a movement of the cargo management device 10 before and after the GPS position data is acquired. In this case, the trigger generation unit 30 may generate the measurement trigger by shifting the measurement timings of the GPS module 11 and the acceleration sensor 12.

(2) The position estimation device 20 according to the first embodiment described above is configured to acquire the GPS position data and the acceleration data from the GPS module 11 and the acceleration sensor 12 every certain period. However, only the GPS position data may be acquired every certain period, and the acceleration data may be acquired from the acceleration sensor 12 to perform the determination by the second data update unit 33 when the first data update unit 32 determines that the GPS position data newly acquired has not changed beyond the variation range, relative to the current position data updated last time.

Figure 8:
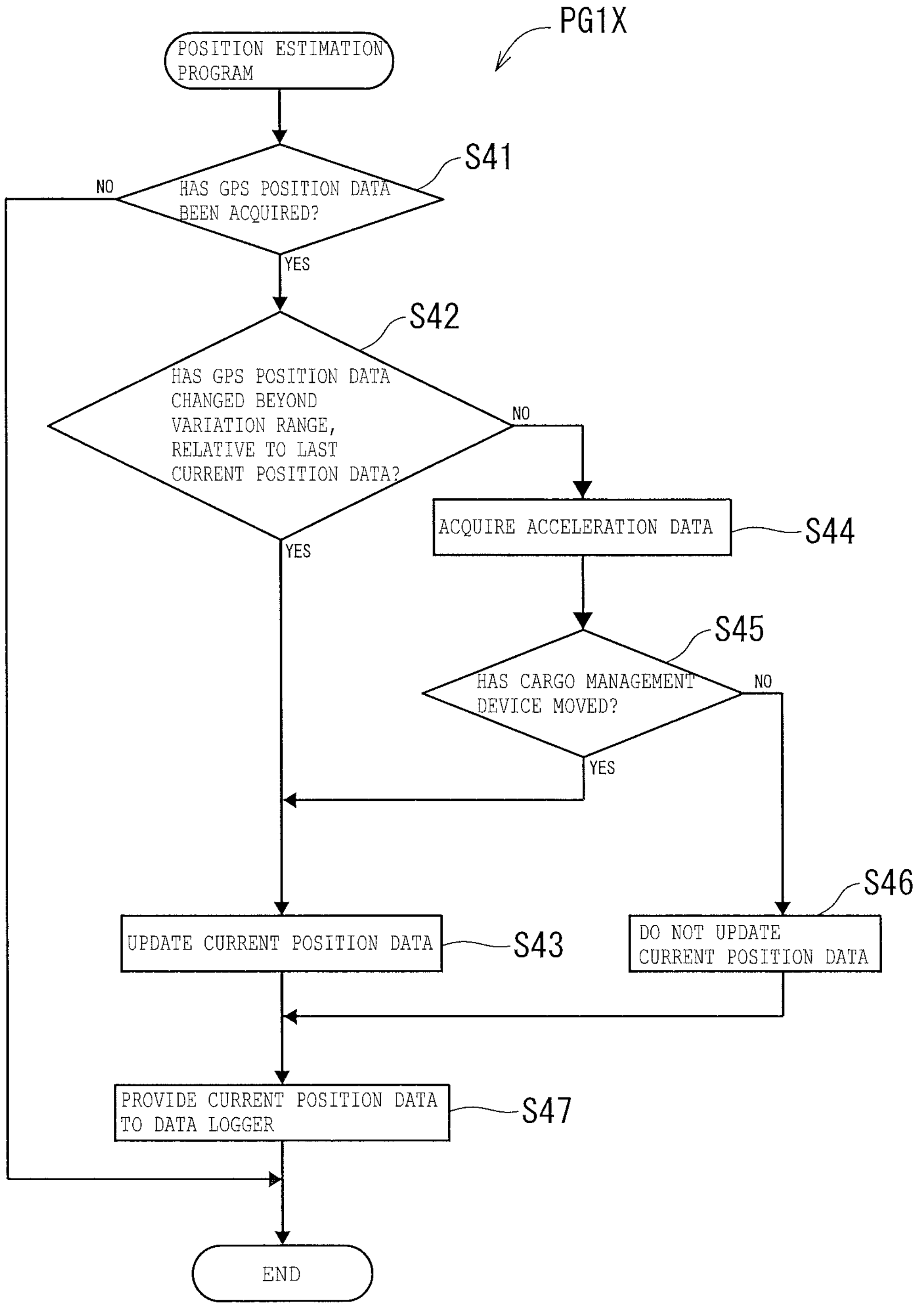
FIG. 8 is a flowchart of a position specifying program according to another embodiment.

Specifically, the CPU 21A of the position estimation device 20 executes a position estimation program PG1X illustrated in FIG. 8. The position estimation program PG1X is executed every time the GPS position data is acquired from the GPS module 11 (YES in S41), and determines whether or not there is a change beyond the variation range between the GPS position data newly acquired and the current position data updated last time (S42). When it is determined that there is a change beyond the variation range, the current position data is updated (YES in S42, S43). On the other hand, when it is determined that there is no change beyond the variation range (NO in S42), the acceleration data is acquired from the acceleration sensor 12 (S44), and the presence or absence of movement of the cargo management device 10 is determined (S43, S45, S46). With this configuration, control of unnecessary acceleration data is suppressed, and unnecessary consumption of a battery can be suppressed.

(3) The data processing unit 31 may include only the first data update unit 32 to update the current position data.

(4) In the above embodiment, the current position data specified by the determination by the first data update unit 32 and the second data update unit 33 is provided to the data logger 14. However, the determination results of the first data update unit 32 and the second data update unit 33 including information on whether or not the cargo P is in the moving state obtained by the determination by the second data update unit 33 and the like may also be provided to the data logger 14 as part of the information on the transport status of the cargo P.

(5) In the above embodiments, the second data update unit 33 detects a movement of the cargo management device 10 using the speed change data and the vibration data as the acceleration data. However, a movement speed may be obtained from the acceleration sensor 12 to determine the movement of the cargo management device 10. With this configuration, even when the cargo management device 10 mounted on a low-vibration mobile body such as a bullet train as described above is moving, it is possible to determine the moving state and update the current position data.

At this time, whether it is moving at a low speed such as walking or moving at a high speed by a vehicle or a train may also be determined from the moving speed, and this may be acquired as part of the information related to the transport status and may be provided to the data logger 14.

(6) In the above embodiments, the presence or absence of movement is determined by the second data update unit 33 using the acceleration sensor 12, but the present invention is not limited thereto as long as the presence or absence of movement is detected.

(7) In the above embodiments, the transport status data D1 accumulated in the storage unit 36 of the data logger 14 is deleted after being transmitted to the cloud server 50. However, the transport status data D1 may remain stored without being deleted.

Furthermore, the storage unit 36 may be a portable storage medium such as a USB memory or an SD card.

(8) The position estimation device 20 may wirelessly transmit the current position data each time the data processing unit 31 updates the current position data. At this time, the measurement value measured by the cargo management sensor 13 may also be wirelessly transmitted every time it is measured.

(9) In the above embodiments, it is configured that the data processing unit 31 includes the first data update unit 32 and the second data update unit 33, and updates the current position data on the basis of the determination results by those update units. However, it may be configured that a third data update unit different from the first data update unit 32 and the second data update unit 33 is included, and the current position data may be updated on the basis of the determination results of the three data update units. The third data update unit determines, for example, whether or not a predetermined time has elapsed since the current position data was updated. Even if the first data update unit 32 and the second data update unit 33 determine that the change in the GPS position data is not due to movement, the third data update unit may update the current position data if the predetermined time has elapsed.

(10) The identification number storage unit 54C of the cloud server 50 may store, for example, a type of cargo, an appearance photograph, a necessary environment (KEEP REFRIGERATED, THIS SIDE UP, etc.), and the like as the information of the cargo P, and the data analysis unit 54 may determine an abnormality on the basis of these pieces of information.

Note that, although specific examples of the technology included in the claims are disclosed in the present specification and the drawings, the technology described in the claims is not limited to these specific examples, and includes those obtained by variously modifying and changing the specific examples, and also includes those obtained by singly extracting a part from the specific examples.

DESCRIPTION OF THE REFERENCE NUMERAL

10 Cargo management device
11 GPS module
12 Acceleration sensor (movement detection sensor)
13 Cargo management sensor
14 Data logger
15 Wireless circuit
20 Position estimation device
32 First data update unit
33 Second data update unit
50 Cloud server (cargo monitoring device)
55 Data transmission unit
70 External terminal
100 Cargo monitoring system
101 Communication network
P Cargo

The invention claimed is:

1. A cargo management device comprising:
a GPS module;
a movement detection sensor configured to detect presence or absence of movement including vibration;
a cargo management sensor configured to measure a measurement value related to a transport status of a cargo; and
a position estimation device configured to update and output current position data by using part of a plurality of pieces of GPS position data sequentially input from the GPS module, wherein
the cargo management device is configured to move together with the cargo,
the cargo management device further comprises:
a first data update unit configured to compare the current position data with GPS position data newly acquired, to determine whether there is a change between the current position data and the GPS position data beyond a variation range of the GPS position data, and to update the current position data with that GPS position data upon determining that there is a change beyond a fixed range predetermined as the variation range, and
a second data update unit configured to acquire a detection result from the movement detection sensor configured to detect presence or absence of a movement including vibration of the position estimation device, to determine whether a movement of the position estimation device has been detected, and to update the current position data with the GPS position data newly acquired upon determining that the movement has been detected, and determination by the first data update unit is performed before determination by the second data update unit, and the determination by the second data update unit is performed on condition that the first data update unit determines that the change is not present.

2. The cargo management device according to claim 1, wherein the movement detection sensor is an acceleration sensor.

3. The cargo management device according to claim 1, further comprising a data logger configured to store the current position data and the measurement value related to the transport status.

4. The cargo management device according to claim 1, further comprising a wireless circuit configured to wirelessly transmit the current position data and the measurement value related to the transport status.

5. A cargo monitoring system comprising:

the cargo management device according to claim 4; and a cargo monitoring device configured to wirelessly receive and store the current position data and the measurement value related to the transport status from the cargo management device.

6. The cargo monitoring system according to claim 5, wherein the cargo monitoring device includes a data transmission unit configured to transmit transmission data based on the current position data and the measurement value related to the transport status to an external terminal via a communication network.

7. A cargo management device comprising:

a GPS module;

a movement detection sensor configured to detect presence or absence of movement including vibration;

a cargo management sensor configured to measure a measurement value related to a transport status of a cargo; and a position estimation device configured to update and output current position data by using part of a plurality of pieces of GPS position data sequentially input from the GPS module, wherein the cargo management device is configured to move together with the cargo, the cargo management device further comprises:

a first data update unit configured to compare the current position data with GPS position data newly acquired, to determine whether there is a change between the current position data and the GPS position data beyond a variation range of the GPS position data, and to update the current position data with that GPS position data upon determining that there is a change beyond a fixed range predetermined as the variation range, and a second data update unit configured to acquire a detection result from the movement detection sensor configured to detect presence or absence of a movement including vibration of the position estimation device, to determine whether a movement of the position estimation device has been detected, and to update the current position data with the GPS position data newly acquired upon determining that the movement has been detected, and determination by the second data update unit is performed before determination by the first data update unit, and the determination by the first data update unit is performed on condition that the second data update unit determines that the movement has not been not detected.

8. The cargo management device according to claim 7, wherein the movement detection sensor is an acceleration sensor.

9. The cargo monitoring device according to claim 7, further comprising a data logger configured to store the current position data and the measurement value related to the transport status.

10. The cargo management device according to claim 7, further comprising a wireless circuit configured to wirelessly transmit the current position data and the measurement value related to the transport status.

11. A cargo monitoring device comprising:

the cargo management device according to claim 10; and a cargo monitoring device configured to wirelessly receive and store the current position data and the measurement value related to the transport status from the cargo management device.

12. The cargo monitoring device according to claim 11, wherein the cargo monitoring device includes a data transmission unit configured to transmit transmission data based on the current position data and the measurement value related to the transport status to an external terminal via a communication network.

* * * * *